US006817840B1

(12) United States Patent
Schwarzkopf

(10) Patent No.: US 6,817,840 B1
(45) Date of Patent: Nov. 16, 2004

(54) SHAFT SEAL, IN PARTICULAR FOR AN AXIAL PISTON DISPLACEMENT COMPRESSOR

(75) Inventor: Otfried Schwarzkopf, Magstadt (DE)

(73) Assignee: Zexel Valeo Compressor Europe GmbH, Weiterstadt (DE)

( * ) Notice: Subject to any disclaimer, the term of this patent is extended or adjusted under 35 U.S.C. 154(b) by 32 days.

(21) Appl. No.: 10/089,268

(22) PCT Filed: Sep. 29, 2000

(86) PCT No.: PCT/EP00/09564
§ 371 (c)(1),
(2), (4) Date: Jul. 8, 2002

(87) PCT Pub. No.: WO01/23790
PCT Pub. Date: Apr. 5, 2001

(30) Foreign Application Priority Data

Sep. 30, 1999 (DE) .......................... 199 47 007

(51) Int. Cl.[7] ................................. F04B 1/12
(52) U.S. Cl. ................ 417/269; 277/358; 92/12.2; 91/499
(58) Field of Search .................... 417/269; 277/358, 277/377, 372, 389; 91/499; 92/12.2

(56) References Cited

U.S. PATENT DOCUMENTS

| 1,841,298 | A | * | 1/1932 | Ploeger ................ 277/358 |
| 4,095,807 | A | | 6/1978 | Jandt et al. |
| 5,938,206 | A | * | 8/1999 | Klosterman et al. ........ 277/358 |
| 6,544,004 | B2 | * | 4/2003 | Fujii et al. ................ 417/269 |

FOREIGN PATENT DOCUMENTS

| DE | 748339 | 1/1945 | |
| DE | PS 390 640 | 8/1965 | |
| DE | 25 00 904 | 7/1975 | |
| DE | 3809001 A1 | * 10/1988 | .............. 415/174.3 |
| DE | 42 06 185 A1 | 9/1993 | |
| EP | 0 195 205 | 1/1986 | |
| EP | 591586 A1 | * 4/1994 | ................ 277/358 |
| EP | 0 864 787 A2 | 9/1998 | |
| FR | 01815 | 9/1965 | |
| GB | 653 608 | 5/1951 | |
| GB | 2 083 079 | 3/1982 | |
| JP | 59226765 A | * 12/1984 | ................ 277/358 |

OTHER PUBLICATIONS

Yamada et al.; Shaft Sealing Mechanism of Compressor with Mechanical Seal; May 29, 2003; entire document. US 2003/0098547 A1.*

* cited by examiner

Primary Examiner—Cheryl J. Tyler
(74) Attorney, Agent, or Firm—Andrus Sceales Starke & Sawall, LLP

(57) ABSTRACT

The invention relates to a subassembly, consisting of a drive shaft (12), a housing (10) with a through-bore (19), through which the drive shaft projects out of the housing and an axial mechanical seal consisting of a rotating seal ring (22) and a counter-ring (20) which forms a seal between the drive shaft (12) and housing (10) components. The invention aims to improve the assembly of the axial mechanical seal and the thermal dissipation from said mechanical seal. To this end, the counter-ring (20) is configured as one single piece with one of the two components (10, 12). This obviates a separate assembly of the counter-ring and allows the heat produced by friction to be dissipated directly into one of the two components.

3 Claims, 2 Drawing Sheets

SHAFT SEAL, IN PARTICULAR FOR AN AXIAL PISTON DISPLACEMENT COMPRESSOR

CROSS REFERENCE TO RELATED APPLICATION

Figure 1:
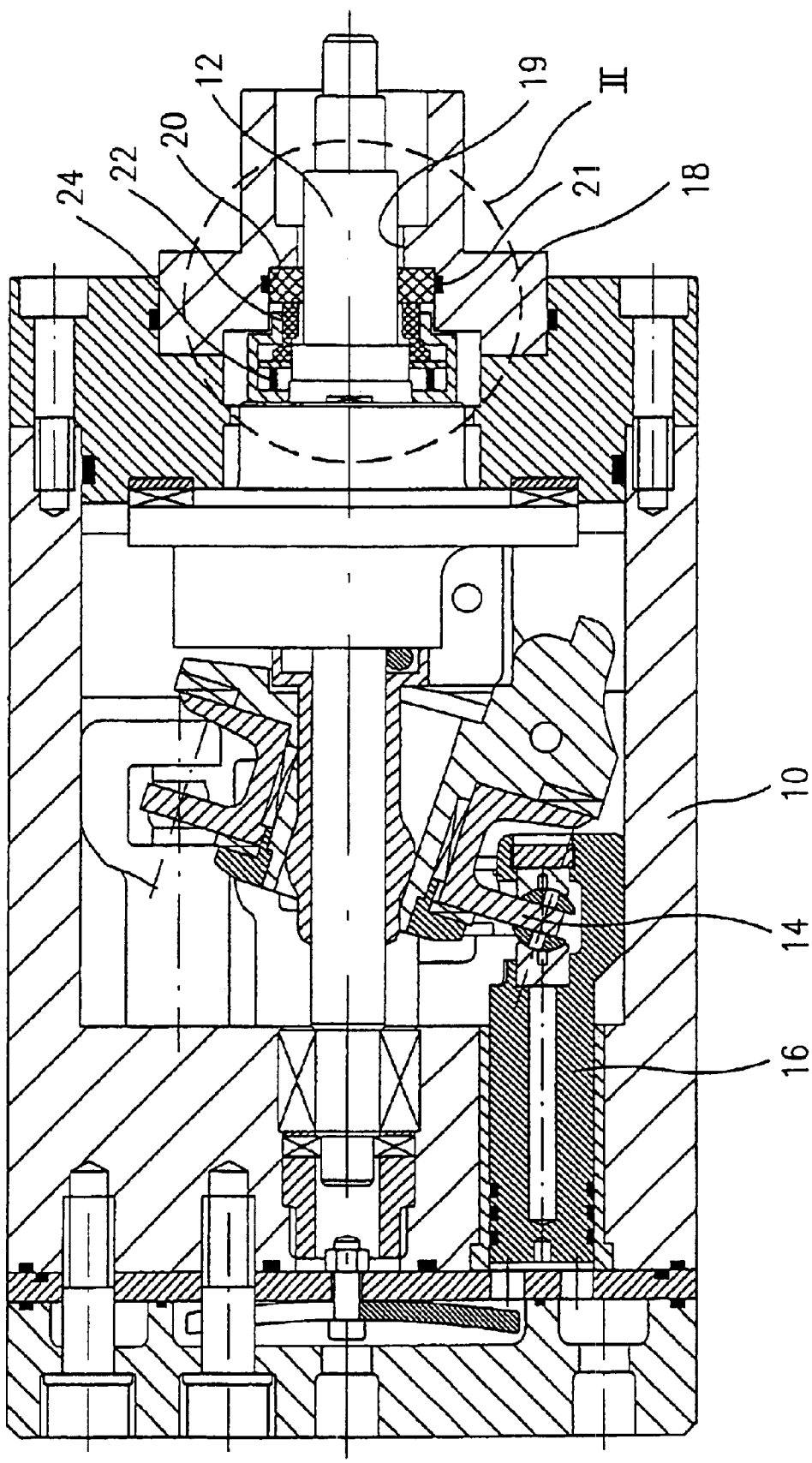

The present application is the U.S. national stage application of International Application PCT/EP00/09564, filed Sep. 29, 2000, which international application was published on Apr. 5, 2001 as International Publication WO 01/23790 A1. The International Application claims priority of German Patent Application 199 47 007.3, filed Sep. 30, 1999.

STATE OF THE ART

The invention relates to a subassembly consisting of a drive shaft, a housing with an aperture through which the drive shaft projects out of the housing, and an axial face seal comprising a sliding ring and a counter-ring, which creates a seal between the components drive shaft and housing. Expressed more generally, the invention relates to the sealing of shaft exit apertures by means of a seal consisting substantially of a sliding ring and a counter-ring against which the sliding ring is pressed in the axial direction of the shaft. The invention relates in particular to an axial piston compressor in which the housing is closed by a cover plate within which is disposed the exit aperture for the drive shaft as well as an axial face seal for the drive shaft. Such a compressor, with a subassembly of the kind described above, is known from the patent EP 0 864 787 A2.

In the following the invention is described with reference to an exemplary application for an axial piston compressor such as can be used in particular in an air-conditioning unit for motor vehicles. However, as explained at the outset, the invention can be employed in general for machines that comprise an axial face seal.

An axial piston compressor in a vehicle air conditioner serves to suck in a coolant from a heat-transfer compartment, in which it evaporates while taking up heat, and to raise its pressure by compression, so that in another heat-transfer compartment the coolant can release the heat again at a higher temperature level. Subsequently the coolant enters an expansion organ, where it is returned to the pressure level of the first heat-transfer compartment. The function of such axial piston compressors in such a coolant cycle is generally known, so that it need not be explained further here.

An especially important component of an axial piston compressor used in a vehicle air conditioner is the sealing element for the drive shaft. The shaft seal of an open compressor is of particular significance because leakages of the circulating coolant, in particular a coolant leakage through the the shaft seal, has a negative effect on the operating behaviour of the air conditioner by reducing the amount of coolant contained. Furthermore, it is prohibited to allow certain coolants to enter the atmosphere.

As shaft seals in axial piston compressors employing the coolant R134a radial shaft sealing rings are customarily used, because in the presence of the pressure differences encountered there, against which the seal must operate, these rings provide sufficiently reliable sealing at low cost. Such a radial shaft sealing ring is in general inserted into a recess on the outer surface of the housing.

Very recently it has become more common to employ the coolant $CO_2$ as a substitute for the coolant R134a, because $CO_2$ offers many advantages over R134a. However, the coolant $CO_2$ requires a higher pressure level than R134a, so that more technically demanding seals are needed. Therefore it is customary to use axial face seals, in which owing to the cooperation of sliding ring and counter-ring, which are pressed against one another, it is possible to obtain adequate sealing against the high pressure difference. The axial face seal, however, cannot be mounted on the outer surface of the housing, but rather must be disposed in the interior of the housing, for instance behind a cover plate. Furthermore, the relative rotation between the sliding ring and the counter-ring generates so much frictional heat that a controlled dissipation of that heat seems desirable. However, in axial piston compressors for vehicle air conditioners no separate lubricant circulation is provided that could be used to carry away the frictional heat in the region of the sliding ring, nor does the mist of lubricant in the interior of the housing of the axial piston compressor suffice to dispose of the frictional heat produced.

The objective of the invention is thus to provide a shaft seal that can be mounted simply and economically and that enables good dissipation of the frictional heat that is generated.

ADVANTAGES OF THE INVENTION

In a subassembly in accordance with the invention, because the counter-ring is no longer a separate part that must be inserted into the cover plate, less effort is required for installation. Because the counter-ring itself need no longer be so stable that it can be manipulated and mounted as a separate component, it can be made considerably less thick than conventional counter-rings, which for example must be pressed into a recess. The diminished thickness of the counter-ring offers two advantages. First, it reduces the length of the whole structure. Second, it improves the heat dissipation. That is, although such counter-rings are customarily made of material with extremely poor thermal conductivity, because the counter-ring is less thick it can adequately conduct heat away from the component into which it is integrated. The thermal conductivity is also improved in comparison with state-of-the-art constructions in that the counter-ring is now directly connected to the relevant component rather than being partially isolated therefrom, for instance by O-rings that must be pressed into place to serve as seals for the counter-ring according to the state of the art.

The above term "integrated" is used in the sense of this application firstly to designate a unit in which the counter-ring is non-removably connected to the component on which it is seated, and secondly to indicate that said component is so configured that the counter-ring is formed by a section of the component itself.

According to one embodiment of the invention the counter-ring can be glued, welded or soldered to the component that supports it. By this means, with little effort the desired integral and gas-tight connection between counter-ring and supporting component is achieved.

According to another embodiment the counter-ring is formed by a coating applied to the relevant component, for example by means of a CVD or PVD process. This allows the counter-ring to be made particularly thin, so that the axial length of the overall structure is very small. Another result is that the heat conduction from the counter-ring to the supporting component is optimized, because no insulating intermediate layers are present. Still another advantage is that a counter-ring can be obtained, the surface of which needs no further treatment.

The coating is preferably a ceramic layer. A counter-ring so formed is especially resistant to wear and tear. After the ceramic coating has been applied, it is preferably treated mechanically so as to produce the desired low degree of surface roughness.

The ceramic coating preferably consists of SiC. Tungsten carbide is also a suitable material. Then the sliding ring can be made of impregnated hard carbide, which has proved an advantageous pairing with respect to friction. With such a frictional pairing it is preferable for the material with the better thermal conductivity, in this case SiC (with a thermal conductivity of 125 W/mK), to be used for the counter-ring, which then because it is integrated with the supporting component conducts the frictional heat produced in the axial face seal better than would be the case for a configuration in which the impregnated hard carbide (with a thermal conductivity of 25 W/mK) was responsible for conducting heat away from the housing.

According to a preferred embodiment of the invention the counter-ring is made in one piece with the housing, in which case the latter consists of aluminium or an aluminium alloy. Such a housing part can be especially well coated with a layer of tungsten carbide, because the temperature of the housing part during the coating process does not exceed 200° C. Layer thicknesses of 0.1 mm to 1 mm can be achieved. By mechanical finishing, for example polishing, a surface roughness Ra of 0.06 mm can be obtained. The hardness of such a layer is 75–80 HRC.

According to another embodiment of the invention it is provided that the counter-ring is an integral component of the housing, i.e. is produced by working the surface of the housing itself. A prerequisite is that the cover plate be made of a material suitable for creating a seal in cooperation with the sliding ring. The counter-ring is then formed by processing an annular region of the cover plate in such a way as to achieve the required smooth surface.

According to the preferred embodiment of the invention, the sliding ring is provided with a groove on its bearing surface that cooperates with the counter-ring. This groove acts as an oil pocket. This interruption in the bearing surface of the sliding ring in effect produces two bearing surfaces one after the other, which increases the efficiency of the seal. Alternatively, the counter-ring could be provided with a groove. It is also possible to make the bearing surface of the counter-ring convex or concave, so as to allow for deformations under the action of heat.

An axial piston compressor in accordance with the invention offers the advantage that it is possible for the frictional heat that is generated to be especially well transferred from the counter-ring directly into the housing of the compressor. This reduces the warming of the axial face seal, which results in less thermal and mechanical distortion and deformation. Furthermore, installation is simplified because the counter-ring does not need to be separately inserted into the cover plate. Here the term "cover plate" is understood to mean the part of the housing that is provided with the exit opening for the drive shaft; depending on the structural design and nature of mounting of the compressor, this part can also be the central part of the housing. Economical advantages are also obtained, because in comparison to the state of the art two parts are eliminated, namely the counter-ring as a separate component and the O-ring that would otherwise be needed as a seal for the counter-ring. If leakage should occur in the region of the axial face seal, a new counter-ring can be installed with little effort simply by exchanging the cover plate.

Advantageous embodiments of the invention will be evident from the subordinate claims.

DRAWINGS

Figure 2:
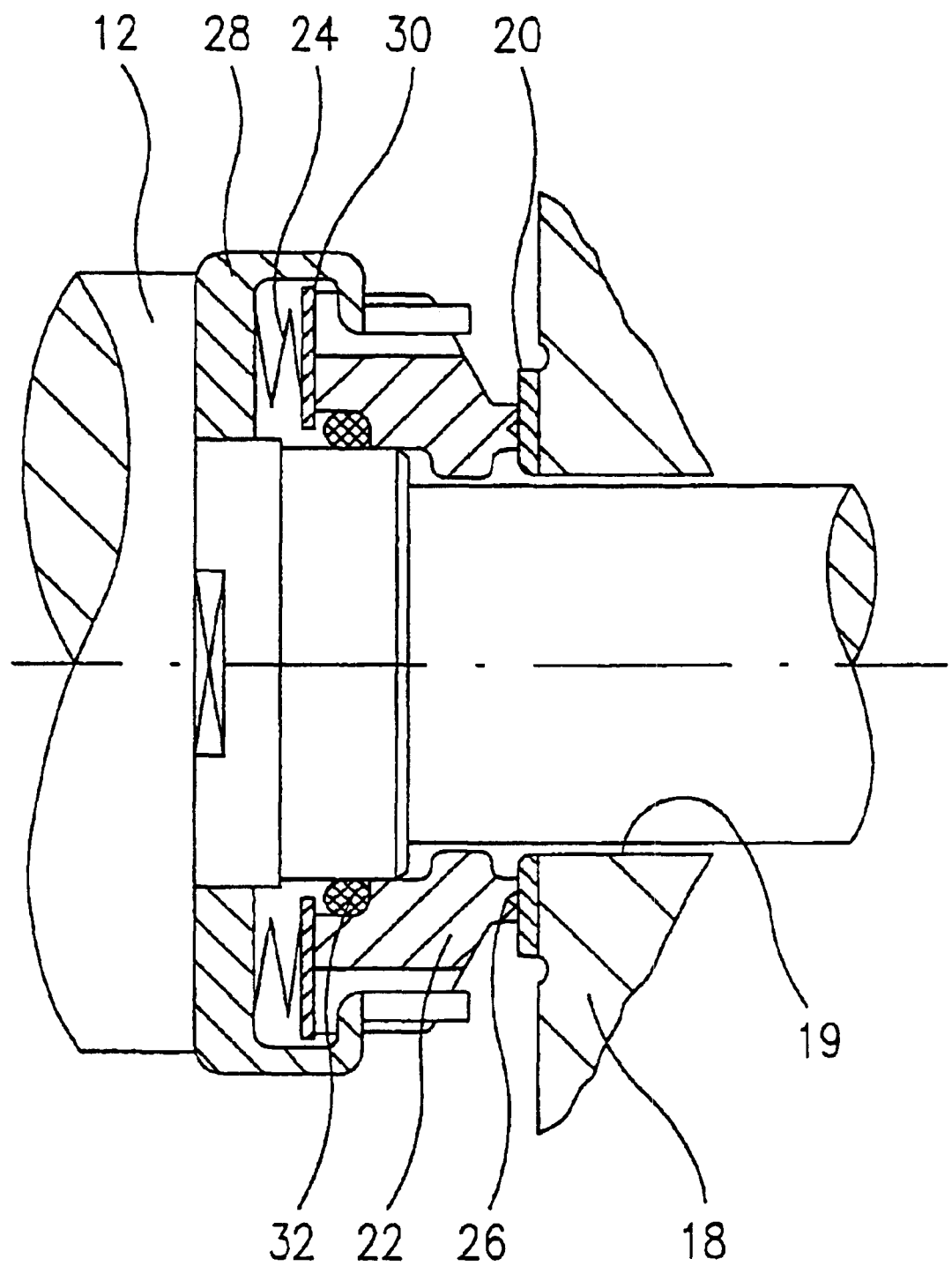

In the following the invention is described with reference to the attached drawings, wherein FIG. 1 shows an axial piston compressor according to the state of the art, in a schematic sectional view;

FIG. 2 shows on a larger scale a part of an axial piston compressor in accordance with the invention, corresponding to the region II in FIG. 1.

DESCRIPTION OF THE EXEMPLARY EMBODIMENT

In FIG. 1 an axial piston compressor according to the state of the art is shown. It contains a housing 10 in which a drive shaft 12 is rotatably mounted. Seated on the drive shaft is a wobble plate 14 that cooperates with pistons 16. In FIG. 1 only a single piston is visible; in fact, as many as seven pistons are provided, each of which is translationally displaceable within a cylinder. In the region where the drive shaft 12 emerges from the housing 10 there is disposed a cover plate 18 provided with an exit aperture 19 through which the drive shaft 12 passes out of the housing 10. Pressed into the cover plate is a counter-ring 20 with an O-ring 21. A sliding ring 22 makes contact with the counter-ring 20 and is pressed against the counter-ring by a spring 24. By this means an axial face seal is formed, which seals off the housing from the exterior space in the region of the exit aperture 19.

In FIG. 2 the configuration of the seal in the region where the drive shaft 12 passes through the cover plate is shown for an axial piston compressor in accordance with the invention. The counter-ring 20 is made integral with the cover plate 18, being formed by a thin layer of SiC. Apposed to the counter-ring 20 is the sliding ring 22, which can consist for example of impregnated hard carbide and is provided with a V-shaped groove 26 in its bearing surface.

The embodiment in accordance with the invention also employs a spring 24, which presses the sliding ring 22 against the counter-ring 20. The sliding ring is disposed in the interior of a spring holder 28, which together with a capture plate 30 ensures that a self-contained subassembly is formed. Between the sliding ring 22 and the drive shaft 12 an O-ring 32 is disposed; this ensures that the sliding ring 22 cannot rotate with respect to the drive shaft 12, so that rotation of the drive shaft causes a relative rotation between the sliding ring 22 and the counter-ring 20.

It is in principle also possible to reverse the arrangement of sliding ring and counter-ring: the counter-ring could be constructed in one piece with the drive shaft, for example on a shoulder of the shaft, and the sliding ring could be disposed on the housing, with a force applied to press it against the counter-ring.

LIST OF REFERENCE NUMERALS

10: Housing
12: Drive shaft
14: Wobble plate
16: Piston
18: Cover plate
19: Exit aperture
20: Counter-ring
21: O-ring
22: Sliding ring

24: Spring
26: Groove
28: Spring holder
30: Capture plate
32: O-ring

What is claimed is:

1. An axial piston compressor, having a drive shaft (12), disposed in a housing (10) having an exit aperture (19) located in an cover plate (18) through which the drive shaft projects out of the housing, and an axial face seal with a sliding ring (22) and counter-ring (20) that produces a seal between the drive shaft (12) and housing (10), characterized in that the counter-ring (20) is integral with cover plate (18) and sliding ring (22) has a groove (26) on its bearing surface that cooperates with counter-ring (20).

2. The axial piston compressor defined in claim 1 wherein said counter-ring (20) is formed from ceramic material.

3. The axial piston compressor defined in claim 2 wherein the ceramic material is SiC.

* * * * *